United States Patent [19]
Jensen

[11] 3,928,851
[45] Dec. 23, 1975

[54] OBJECT LOCATOR SYSTEM

[75] Inventor: Garold K. Jensen, Pinecrest, Va.

[73] Assignee: The United States of America as represented by the Secretary of the Navy, Washington, D.C.

[22] Filed: Aug. 31, 1960

[21] Appl. No.: 53,312

[52] U.S. Cl. ................................. 343/9; 343/7.7
[51] Int. Cl.² .................................... G01S 9/44
[58] Field of Search ........ 343/5 R, 7.7, 8, 9, 17.1 R; 235/181

[56] References Cited
UNITED STATES PATENTS

| | | | |
|---|---|---|---|
| 3,133,281 | 5/1964 | Young et al. ................... | 343/7.7 X |
| 3,885,240 | 5/1975 | Jensen ................................. | 343/9 |

*Primary Examiner*—T. H. Tubbesing
*Attorney, Agent, or Firm*—R. S. Sciascia; Arthur L. Branning

EXEMPLARY CLAIM

3. An object locator system comprising, means emitting signals, means for receiving signals returned by distant objects, means for storing received signals, a narrow bandwidth analysis channel, means for controlling the playback of stored signals whereby signals stored intermittently for a selected range are played back continuously without substantial intervening time interruptions, and means for varying the frequency of playback signals whereby they are held within the bandwidth of the analysis channel.

5 Claims, 6 Drawing Figures

OBJECT LOCATOR SYSTEM

The invention described herein may be manufactured and used by or for the Government of the United States of America for governmental purposes without the payment of any royalties thereon or therefor.

This invention relates to object detecting systems in general and in particular to electronic devices of the class identified as radar. In further particularity it relates to integrating or correlating systems wherein short duration pulse echo signals occurring over a period of time are stored and reproduced with a minimum of relative time. Thus the equivalent of a long duration signal is achieved such signal being in a form which can be filtered by narrow band circuitry to reduce noise and thereby improve the signal-to-noise ratio.

In a system of the foregoing type, the inherent limitations of the available storage facilities normally permit only a shallow depth of field. This makes it necessary to employ a form of range gate operation wherein the system analyzes signals for a progressively varying range in a recurrent manner.

The foregoing system is further complicated by relative motion of the radar system and distant energy reflective objects because such motion introduces a doppler frequency shift in the return energy. Such a frequency shift for very rapidly moving targets can be accomodated by providing a plurality of analysis channels sensitive to different bands of frequencies so that if the doppler varied signal does not fall in the pass band of one filter it will fall in the pass band of another filter. Thus a highly successful and sensitive radar system has been evolved providing long range detection of moving targets to an extent not possible with direct received signal display techniques.

The foregoing multifilter system is subject to definite limitations which provide substantial reduction in sensitivity for the detection of targets having certain motion characteristics. Targets having extremely high acceleration and which are in the radar beam for only a short period of time, such as a long range intercontinental ballistic missile, produce such a rapid variation in doppler shift as to spread the analysis signal over so many of the narrow band filters as to prevent the accumulation of any substantial amount of energy in any one filter. This prevents the signal amplitude build-up necessary to provide improvement in signal-to-noise ratio.

It is accordingly an object of the present invention to provide a method of compensation of a cross correlation radar system for targets with high acceleration.

Another object of the present invention is to provide a cross correlation radar system capable of effective detection of high acceleration objects at long range.

Other objects and many of the attendant advantages of this invention will be readily appreciated as the same becomes better understood by reference to the following detailed description when considered in connection with the accompanying drawings wherein:

Figure 1:
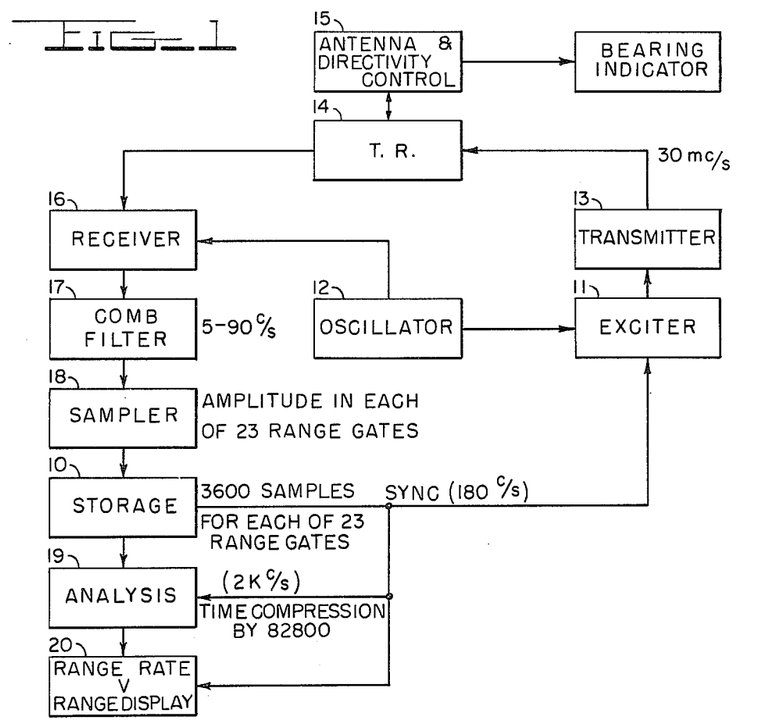
FIG. 1 shows in block form a schematic diagram of a drum storage cross-correlation radar system suitable for use with targets having limited acceleration characteristics.

The apparatus shown in FIG. 1 indicates in general the basic arrangement of a cross correlation radar system providing an overall system gain of approximately 33 db over conventional direct display radar systems. This tremendous increase in sensitivity and reduction in noise is obtained by storing the signals received from selected ranges responsive to a plurality of successive transmitted signals and playing back all of the signals stored for that particular range in rapid sequence.

The overall system is a phase coherent pulse doppler system with the added sophistication of a pulse sampling technique, a magnetic drum storage and cross correlation. The heart of the system is the storage device 10 which in addition to its many other functions provides several timing signals, one being at the frequency of 180 cycles per second from a synchronizing track contained thereon. The 180 cycle synchronizing signal is applied to an exciter 11 which is a form of a gated amplifier. It receives basic r.f. signals from an oscillator 12 and applies them in the form of pulses to the transmitter 13 for the production of high frequency energy in pulses of high power. This energy is delivered through the transmit-receive switching device 14 to antenna 15 which has suitable directivity characteristics for the particular type of operation desired. Echo signals intercepted by antenna 15 are applied through the transmit-receive switching device 14 to receiver 16. Receiver 16 also receives as a basic local oscillator signal the signal from oscillator 12. The output of the receiver 16, which is a doppler signal actually dependent upon the difference in frequency in the return signal and that of the oscillator 12, is applied to a comb filter 17 the purpose of which is to select a range of frequencies of the doppler signal which can be used. Typically to eliminate back scatter caused by undesired reflections, this filter has a lower limit of about 5 cycles per second which is set by the necessity for rejecting back scatter which exists below 4 cycles per second. This filter has an upper limit of 2 KC selecting a 5 to 90 band occurring every 180 cycles (the prf) up to the 2 KC limit.

The doppler signal after it is separated from the back scatter is applied to the sampler 18. The sampler 18 is a combination of more or less conventional circuits capable of separating on a sequential time basis the portions of the doppler signal corresponding to a signal corresponding to a plurality (typically 23) of range gates occurring during the pulse repetiton period. This sampling occurs with very narrow sampling pulses. Thus the output of the sampler normally consists of the typified 23 pulses of short duration occurring in the time interval following each transmitted pulse. Twenty-three range gates are employed on the basis of dividing the total sweep period of 5,555 microseconds by the 240 microsecond pulse width (20 miles). The sampler pulse is approximately 0.07 microsecond duration.

The 23 signals in the output of the sampler 18 are then stored by storage device 10. Storage device 10, in addition to containing the timing signal at the frequency of 180 cycles per second which is used for synchronization purposes, provides a storage of each of the signals for the 23 range gates for 3,600 successive transmitter pulses. Storage device 10 is typically a rotatable magnetizable drum employing magnetic storage techniques in which the periphery of the drum track is divided into approximately 23 portions corresponding to the range gates. Each of the 23 portions has provision for storing 3,600 pulses of 0.07 microseconds duration with a slight amount of overlap. The drum in its rotation and in response to the signals from the sampler 18 produces side by side storage of the amplitude of the sampled signals for each range gate. At the end of a 20 second period 3,600 samples will have been placed side by side in each of the 23 range gates of the drum. At this point the storage drum is filled and from then on the oldest information is erased as the new information responsive to later received signals is recorded in its place.

Read out of the 3,600 samples stored in the 23 range gates is accomplished in one revolution of the drum in storage device 10 or 1/180 of a second. This results in a compression of time by a factor of 82,800 which permits the analysis of all range and range rate gates in no more than the 20 seconds required to fill the storage. Because of the time compression, the original doppler frequencies of five to ninety cycles per second are multiplied to 0.4 to 7.5 megacycles per second. The receiver signal bandwidth of 2 KC is in effect multiplied by this same ratio. Thus if a storage output signal bandwidth of 2 kilocycles per second were also used, which it is as determined by the analysis circuits 19 which include a 2 KC filter, the equivalent narrow banding would be equal to the ratio. In terms of the original signal bandwidth the effective output bandwidth is 1/20 of a cycle per second which allows the recovery of signals buried many db below the noise level. Typically these can be signals which can be detected even though they are as much as the previously exemplified 33 db below the noise level.

Figure 2:
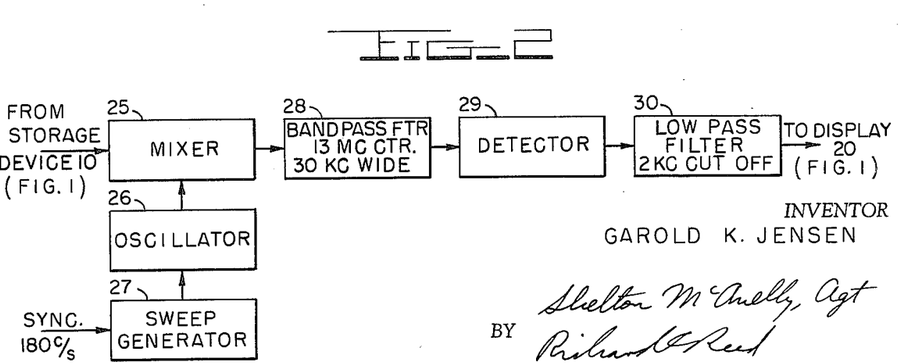
FIG. 2 shows details of the analysis channel 19 of FIG. 1.

The analysis device 19 although shown in greater detail in refined form in FIG. 2 is in effect a narrow band filter having the previously typified bandwidth of 2 KC per second. The frequency can be swept over the 0.4 to 7.5 megacycles per second frequency output of the storage device 10 at a rate of one bandwidth of the analysis device per revolution of the drum of storage device 10. All 23 range gates are examined for signals for a particular doppler frequency or range rate for a given drum revolution. On successive drum revoltuions all range gates are likewise examined for each increasingly higher range rate. To accomplish this in actual practice the filter is not tuned over the doppler band but an equivalent result is obtained by heterodyning with a signal from a variable local oscillator as shown in FIG. 2. The output of the analysis circuit 19 is applied to the display device 20 which produces an intensity modulation on a two coordinate display with range rate forming the ordinate axis and range the abscissa. With a two kilocycle filter bandwidth of the analysis device 19 and a total of 0.4 to 7.5 megacycle range, 3,500 range rate gates would be required in sweeping out the doppler band. This sweeping would take approximately 20 seconds to complete at a drum speed of 180 revolutions per second.

The system can be refined to reduce this 20 second range rate sweep requirement by various techniques. Typically it can be done by utilizing a combination of predetection and post detection narrow banding while maintaining the same output bandwidth instead of all predetection bandwidth narrowing. A limited amount of post detection bandwidth narrowing can be tolerated without an appreciable loss in the sensitivity of the system. The predetection bandwidth was widened to 30 kilocycles while maintaining the output post detection bandwidth at 2 kilocycles. Range rate resolution was decreased as a consequence because the target signals in a range gate now are only required to remain confined to a 30 kilocycles bandwidth instead of a 2 kilocycles bandwidth. Allowing for some overlap, the 0.4 to 7.5 megacycle range will require 236 range rate gates. This will require only about 2 seconds to sweep out instead of the 20 seconds previously mentioned.

As a further refinement the analysis device 19 actually can contain a plurality of channels of different bandwidths, the first being the 30 KC above, with a second channel having a predetection bandwidth of 8 kilocycles to provide for a greater range rate resolution if desired. Typically the 30 kilocycle channel provides a five knot resolution and the 8 kilocycles channel about one knot resolution at the upper end of the operating frequency band. Since 20 seconds was required to fill the storage this means that in the case of the 30 kilocycle channel the target must vary less than 5 knots in velocity in this period or less than 0.5 knot per second or 0.4 feet per second if no loss in signal sensitivity is to be accepted. These figures reveal the difficulty inherent in this system, because the range rate resolution of 0.4 feet per second, although very useful for comparatively slow moving aircraft, is a distinct disadvantage which will result in loss of signal sensitivity when detection of targets of much higher acceleration such as intercontinental ballistic missiles is attempted. When the system as described in the foregoing having a limit of 0.4 feet per second per second accleration for optimum operation encounters an object such as a missile having a typical radial acceleration of 100 feet per second per second, as could occur when the radar observer is in the plane of the missile trajectory, the doppler frequencies will vary much more than the bandwidth of the predetection output filter (30 kilocycles) in 20 seconds. Such action will cause the doppler frequency to sweep over more than 200 range rate gates, on an average, thus dividing the signal energy by a like ratio which results in a loss of 23 db in signal sensitivity. It is to avoid this very substantial sensitivity loss that the device of the present invention is directed. In brief it may be described as apparatus for maintaining the doppler signal within the 30 kilocycles bandwidth of the predetection filter despite the wide doppler frequency shift that occurs due to the high rate of acceleration of the missile. The general description of the operation of the improvement of the invention is the modulation of the local oscillator frequency feeding the analysis channel with a time verying function which is just the reverse of the time variation of the doppler frequency coming from the drum storage so as to effect a cancellation of this variation. When the match between the local oscillator modulation and that of the variation of the doppler signal is sufficiently close, the resultant signal will remain in the analysis filter for the full time, that is, 240 microseconds on read-out, the width of one range gate, and a full amplitude output signal will be available for display.

The foregoing rather simple statement of the invention is complicated by the fact that it is, of course, impossible to determine in advance at what point an enemy missile will be launched and what the time varying characteristics of the acceleration of that missile will be relative to the spot at which the radar itself is located. Many, many factors are involved all of which can be varied in practically an infinite number of different ways. This makes a system having a simple single time varying function no more valuable on a statistical basis than the basic system itself. Thus means must be provided for accomodating a large number of different functions and trying each of them upon the received signals so that eventually an acceptable match will be found which will result in a full amplitude signal build up in the analysis filter. These functions and the periodic use and comparison thereof with return signals will effectively establish a series of acceleration gates.

As if the foregoing complication as to wide spread of azimuth angles with respect to the radar site as well as missile velocity and acceleration characteristics were not serious enough, in the majority of cases the target will be moving steadily through the range gate in which it appears. Since the modulating function can be only one range gate in duration, the doppler received target signal must be nearly centered in the range gate for an acceptable match to occur. This therefore requires that all of the functions be tried more frequently than every integration period of 20 seconds as previously set forth. Thus a very serious problem having considerable complications is presented because of the time required to examine all ranges, range rates and acceleration gates for targets.

The addition of acceleration gates to the radar in effect adds a third dimension to the information flowing from the system. As previously described the indication on device 20 is a range versus range rate presentation wherein 20 seconds is required to completely fill the storage of the system and 2 seconds is required for the analysis equipment to examine each range and range rate gate combination for targets. Should it be desired to examine each range and range rate gate combination for targets having a particular acceleration, it would take another 2 seconds and an additional 2 seconds for each additional acceleration gate. If 300 acceleration gates are required the total analysis time will add to 600 seconds before repeating. This is completely unacceptable because of the length of time in relation to missile transit time from the earth to the ionosphere and because the signal may persist in the storage for no longer than 20 seconds. What is needed and what is provided by the present invention is a method of signal analysis that uses no more time to examine the information in three coordinates than the basic system of FIG. 1 takes in 2 coordinates.

With reference now to FIG. 2, details of the analysis apparatus 19 of FIG. 1 are shown. The output from the storage device 10 which contains signals in the region from 0.4 to 7.5 megacycles per second is delivered to a mixer 25. Mixer 25 also receives a signal which is swept in frequency from 13.4 to 20.5 megacycles per second obtained from oscillator 26. Control of the frequency of oscillator 26 is accomplished by sweep generator 27 which is synchronized to the 180 cycle per second signal obtained from the storage device 10 to produce a substantially linear sweep of frequency of oscillator 26. Mixer 25 is connected to a predetection bandpass filter 28 which has bandpass characteristics such that a band 30 kilocycles wide with a center frequency of 13 megacycles per second is obtained. Filter 28 is connected to a detector 29 by means of which the envelope of the output of the bandpass filter 28 is obtained. Detector 29 is connected to a low pass filter 30 having a 2 kilocycle per second cut-off frequency and constituting the post detection filtration. The output signal from low pass filter 30 is that which is delivered to the range rate versus range display device 20 of FIG. 1.

Figure 3:
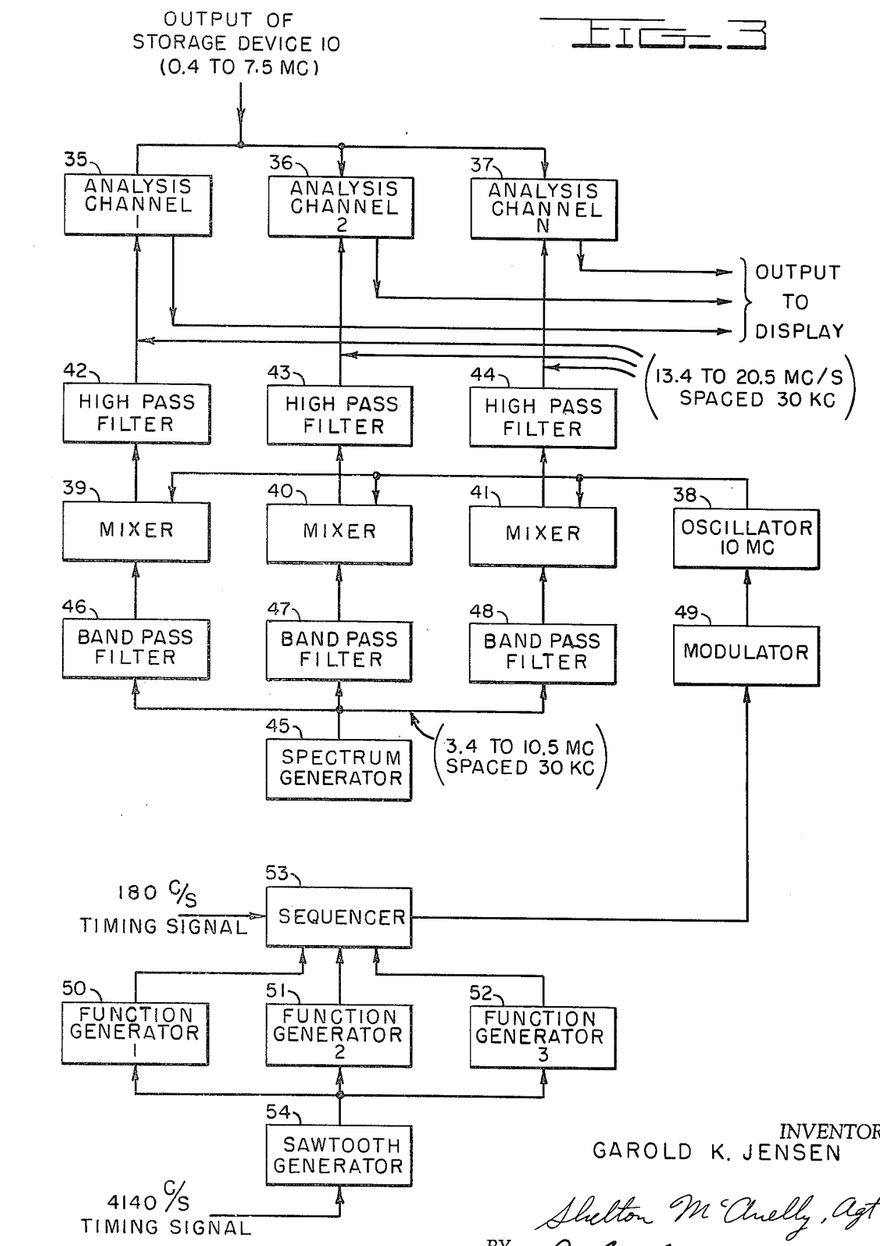
FIG. 3 shows in block form a diagram of the parallel analysis channel apparatus and acceleration compensation apparatus of the present invention.

FIG. 3 shows the arrangement of the apparatus when the analysis channel is paralleled as a first step toward the concepts of the present invention. It is basically similar to the previously described FIG. 2 with the exception that a common local oscillator signal is employed for all channels, with each frequency for each channel differing from the adjacent channel by 1 bandwidth, or 30 kilocycles, produced by mixing with a spectrum of signals. For the basic analysis channel paralleling the oscillator frequency is fixed. The individual channel signals occupy the band from 13.4 to 20.5 megacycles typically. Thus a total of 236 channels is required for the complete coverage of which 3 channels are typified in FIG. 3. Thus the apparatus of FIG. 3 has analysis channels 35, 36 and 37 which are controlled in frequency of operation so as to be selective to a portion of the output of storage device 10 by a series of oscillator signals and filters. The fixed oscillator frequency is obtained from oscillator 38 which for the moment may be considered as operative at 10 megacycles per second, the subsequently described modulator 49 being inoperative. This signal is mixed in a plurality of mixers 39, 40 and 41 with a plurality of signals in the 3.4 to 10.5 megacycles per second range, these signals being spaced 30 kilocycles apart. Thus the output of mixer 39 may typically be at a frequency of 13.4 megacycles per second, mixer 40 at a frequency 30 kilocycles above, and so forth for the 236 analysis channels. Selection of the proper frequency of the output from each of the mixers 39, 40 and 41 is accomplished by the respective high pass filters 42, 43 and 44. The 3.4 to 10.5 megacycle signals delivered to the mixers are obtained from a spectrum generator which produces a plurality of signals over the range of 3.4 to 10.5 megacycles, the signals being spaced 30 kilocycles apart. Selection of the proper signal in the output of the spectrum generator 45 is accomplished for each channel by an appropriate bandpass filter 46, 47 and 48.

The basic portion of FIG. 3 which has thus far been described is primarily equivalent to that of FIG. 1 as enlarged by the addition of a plurality of analysis channels of FIG. 2 to permit the apparatus to operate at a plurality of accelerations above the basic limiting acceleration of 0.4 feet per second per second for a single channel having 30 kilocycles bandwidth. In such an operation the apparatus will read out in 5.5 milliseconds all range and range rate gates for all non-accelerating targets instead of requiring 2.0 seconds as before. It has previously been mentioned that the foregoing system is subject to difficulties when accelerations higher than 0.4 feet per second per second are involved. This is due to the fact that the signal from a particular target is spread over a plurality of range rate analysis channels. Thus frequency variation of the basic 10 megacycle per second signal produced by oscillator 38 is employed to secure a variation in the operation of the system to compensate for the different accelerations of possible targets. Oscillator 38 is driven by a modulator 49, which may typically be a suitable form of oscillator control device responsive to a modulating function as obtained from a plurality of function generators 50, 51 and 52. These modulating functions produce changes in the frequency of oscillator 38 such as to compensate for changes in the frequency of the output of storage device 10 due to acceleration of the target. Since there is no way of knowing in advance the acceleration characteristics of a particular target, it is thus necessary to provide a plurality of function generators typified by 50, 51 and 52, each of which may provide its characteristic modulation variation for certain acceleration characteristics. Typically it may be desired to have an arbitrarily selected quantity of 360 of the function generators 50, 51, 52 to cover the various missile acceleration characteristics for various aspects, each of which is selected in sequence by the sequencer 53. This may be an electronic switch to control the application of such signal to the modulator 49 for operation upon the oscillator 38. Since most targets will have an acceleration variation which is roughly linear, the basic type of function employed for modulating the oscillator 38 is a sawtooth wave produced by the sawtooth generator 54. The function generators 50, 51 and 52 operate to modify or distort this basic sawtooth wave to obtain the greater or lesser acceleration rates and may even be constructed in such a way as to provide a nonlinear voltage time function. Typically then the function generators 50, 51 and 52 could be merely potentiometers suitable for selecting a particular slope of the modulating signal, or they could include a crystal diode network or other nonlinear arrangement to distort the sawtooth in such a manner as to obtain a nonlinear sort of variation. The modulating signal for all of the various acceleration gates must be repeated for each of the 23 range gates for each revolution of the drum in playback analysis at the 236 range rates occuring simultaneously. Thus the frequency of the sawtooth generator is set at 23 (the number of range gates) multiplied by the basic timing signal frequency of 180 cycles per second since the drum revolves at that speed. Thus the timing of the sawtooth generator 54 must be at 4,140 cycles per second as obtained typically from a track on the drum itself.

With the above apparatus regardless of what the initial range rate or acceleration variation of the accelerating target is, it will fall in a single one of the range rate channels and will thus be detected with maximum sensitivity. The problem of matching a target moving steadily through the range gate has also been resolved by repeating the matching of all 360 functions every 2 seconds (180 cycles per second). Since missiles, even under unfavorable conditions, for the greater part of their flight from pad to ionosphere will take more than 20 seconds to pass through a range gate, at least 10 opportunities will thus be available every 20 seconds to try matching each of the 360 acceleration curves of the function generators 50, 51 and 52. Hence at least one of these tries in each case should be sufficiently well matched in the range axis to fall into a range rate gate (analysis channel) with slight loss of signal sensitivity thus producing detection. Multiple targets pose no problem to this system because all combinations of range, range rate and acceleration are examined for targets every two seconds. Since a typical long range missile may take 270 seconds to reach the F2 ionosphere layer, there may be as many as 13 of the 20-second integration periods available for detection of this missile.

With the necessity and capabilities for examining all combinations of 23 range gates, 236 range rate gates, and 360 acceleration gates every 2 seconds, the rate of information output from the system is very high. Further processing of information from the output from the channels 35, 36 and 37 is thus desired for visual display purposes, as well as digitalization for purposes of computing true target parameters.

Any visual presentation of the above information must contend with the fact that the information now contains 3 variables instead of 2, as in the basic system of FIG. 1. Since it is convenient to display only 2 variables on one planar display, it is necessary to select appropriate pairs of the variables. For example, acceleration versus range might be displayed along with a second display of range rate versus range. If desired, acceleration versus range rate may also be displayed. Acceleration versus range is the simplest pair to process and apply to a cathode ray tube. A raster scan can be formed by sweeping the electron beam horizontally, corresponding to range, in synchronization with rotation of the drum and in the vertical, corresponding to acceleration, in synchronization with the commutation cycle of the sequencer 53.

Figure 4:
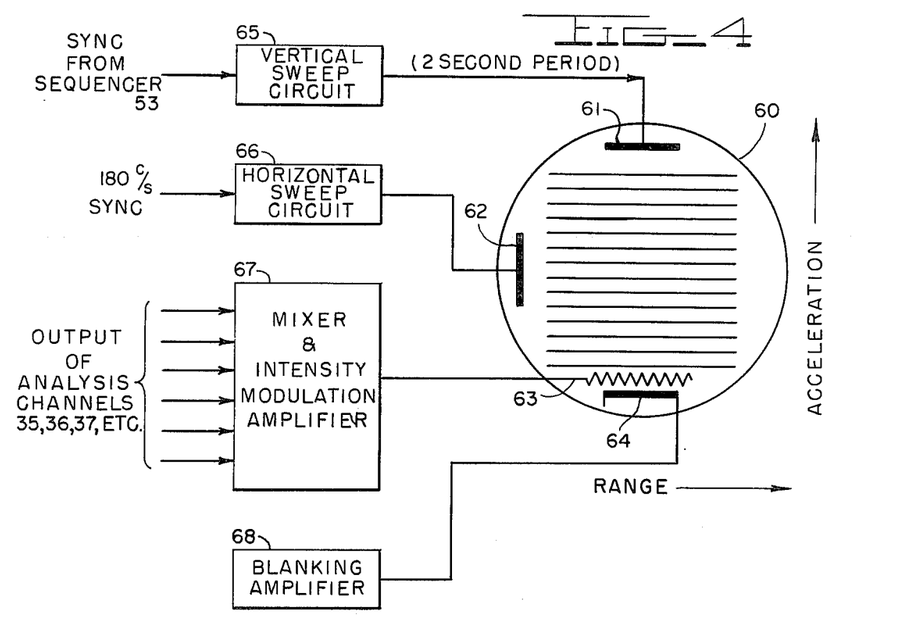
FIG. 4 shows a block diagram of a first display of the information extracted by the apparatus of the present invention.

In FIG. 4 there is indicated more or less schematically a representation of a typical cathode ray tube type of indicator 60 employed for the display of acceleration versus range. As typified, this indicator is of the electrostatic deflection type having in addition to other conventional components not specifically shown, a vertical deflection means 61, a horizontal deflection means 62 and grid and cathode electrodes 63 and 64, respectively. Connected to the vertical deflection means 61 is a vertical sweep circuit 65 which operates with a 2 second sweep period as obtained from the sequencer 53 of FIG. 3. This represents one complete cycle of operation thereof applying all of the 360 function generator signals to the oscillator 38. Horizontal sweep for the indicator 60 is produced by the horizontal sweep circuit 66 at a sweep frequency of 180 cycles per second as obtained from storage device 10 of FIG. 1. The horizontal sweep at 180 cycles per second is the range base while the vertical sweep at a periodicity of 2 seconds is the acceleration base. Intensity control of the presentation of the indicator 60 is in accordance with the outputs of the various analysis channels 35, 36 and 37 of FIG. 3. These outputs are mixed within circuit 67 and amplified to produce intensity modulation of the cathode ray tube indicator 60 in conventional fashion. Additional intensity modulation of the cathode ray tube indicator 60 is provided by blanking amplifier 68 connected to cathode 63 for blanking of the trace during flyback. With the apparatus of FIG. 4, target location is indicated by intensity modulating the control grid of the cathode ray tube to form a bright spot at the proper coordinates of the display. A separate conventional form of bearing indicator cooperative with the antenna directivity control is employed. With the analysis channels 35, 36 and 37 paralleled by the operation of the mixer portion of device 67, the range rate information is not available in this presentation. The result is an inability in this particular indicator to separate targets having the same acceleration but different range rates. The indicator 60 thus provides a bright spot at the appropriate point indicative of the range and acceleration of all reflective objects detected.

Figure 5:
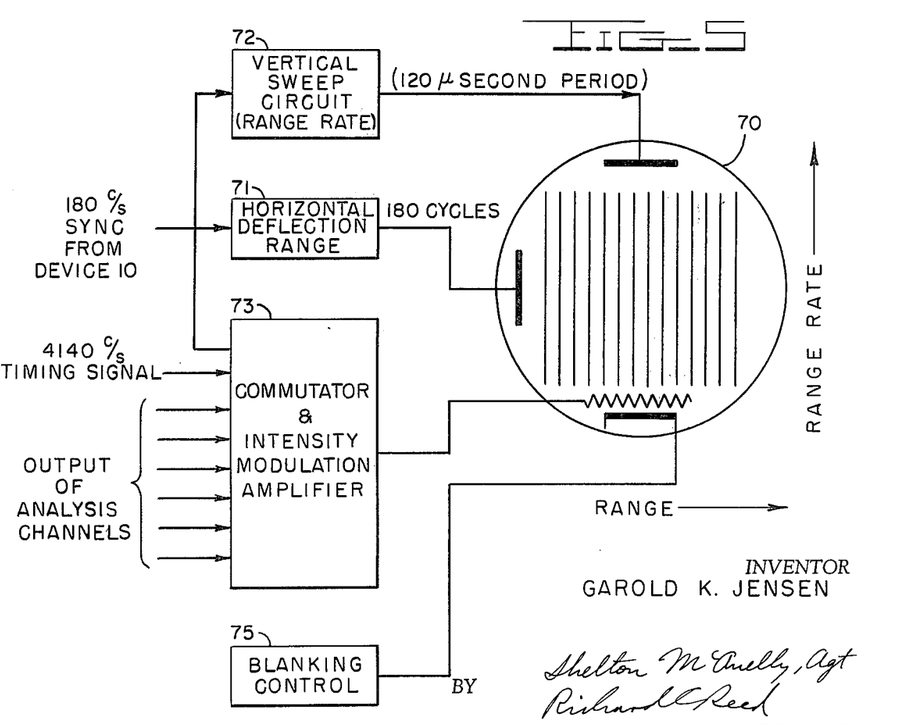
FIG. 5 shows in block form a second display of information extracted by the apparatus of the present invention.

FIG. 5 shows the apparatus pertaining to a second display device for resolving the range rate ambiguity.

This comprises a cathode ray tube type of indicator 70 on which is presented range rate versus range, with the range appearing horizontally and the range rate vertically. The horizontal deflection of the indicator 70 is at a frequency of 180 cycles per second, the pulse repetition frequency of the radar system. The deflection signal at this frequency is provided by the horizontal deflection circuit 71 which is synchronized by the basic 180 cycle per second timing signal from the storage device 10 of FIG. 1.

Vertical deflection of the indicator 70 is provided by vertical sweep circuit 72 operative at a frequency of 8,280 cycles per second or about a 120 microsecond periodicity. The operation of this sweep circuit is synchronized by the operation of the drum storage device 10 of FIG. 1 through commutator 73. Intensity modulation of the indication of device 70 is provided by a suitable commutator and modulation amplifier circuit 73 which is synchronized by the 4,140 (23 × 180) cycle per second signal to produce time sharing of the outputs of the various analysis channels 35, 36 and 37 etc. Thus each analysis channel is connected to the indicator device in sequence and in synchronism with the vertical sweep to produce intensification of a spot on the face of the tube indicative of the range rate of a reflective object at a particular range. Such a presentation as this resolves the range rate ambiguity in the presentation by the indicator 60 of FIG. 4. As with the apparatus of FIG. 4, appropriate blanking of the tube is provided by a blanking control 75 connected to the cathode of indicator 70 to produce suppression of the beam thereof during flyback periods.

The display of range rate versus range information is more difficult than the previous presentation of acceleration versus range for several reasons. One is that range rate information appears simultaneously at the outputs of all of the 236 separate range rate channels typified by the numerals 35, 36 and 37 of FIG. 3, one for each of the range rate gates. Because the range rate information does appear simultaneously it cannot be applied directly to the cathode ray tube display but must be converted into a sequential form. Conversion to sequential form can be accomplished by the electronic commutation system 73 which may include memory components and which examines the output of each range rate channel in sequence for target signals. If full use is to be made of all of the range rate and range information available in the overall system, the examination cycle must be completed during the time of each range gate. Preferably, at least 2 full cycles of such examination should be completed in the 240 microsecond period of each of the 23 range gates to insure detection of the nonrectangular target pulses. This thus sets the periodicity of the vertical sweep at 120 microseconds corresponding to a sweep frequency of 8,280 cycles per second.

These requirements dictate the type of raster scan which must be employed on the range rate versus range display. If range rate is presented along the Y coordinate and range along the X coordinate, then the raster scan will be that as described previously in connection with FIG. 5. The result of the overall presentation is that when a target signal appears at the output of one of the range rate channels its presence will be detected in the corresponding portion of the examination cycle and it will then, through synchronization of sweep circuits and the examination cycle, also be presented on the display 70 at the proper range rate and range coordinates.

Another problem that must be considered, when dealing with missile targets, is that under unfavorable conditions a signal may exist for no longer than about 20 seconds. This time is sufficient to fill the storage device 10, but since information older than 20 seconds is steadily erased to make way for the storage of new information, there will be only 20 seconds available for the analysis and detection of the target. Even though the signal is completely analyzed 10 times in the 20 seconds, only one or two of the 10 analyses may produce a detection if the target is moving rapidly through the range gate. Thus it is evident that if the target produces only one "blip" and no more, it would be most desirable to employ a display with a very long persistence. Devices such as visual read out storage tubes are advantageous for this application. Actually such a long persistence device is also desirable in the indicator 60 of FIG. 4 for the same reason.

Figure 6:
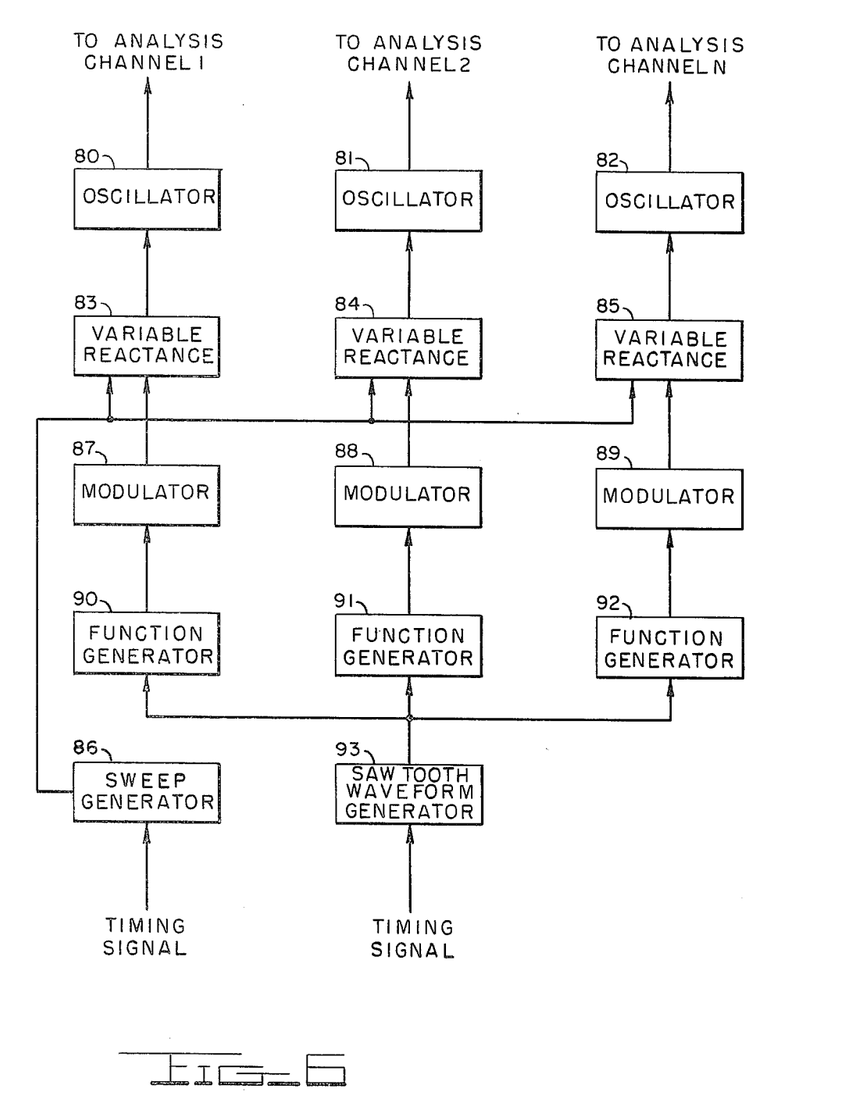
FIG. 6 shows a variation of the apparatus of FIG. 3.

The apparatus of the foregoing discussion can be based on a slightly different approach. Instead of using range rate analysis channels 35, 36 and 37, spaced 30 kilocycles apart to allow for the bandpass characteristics of the system, requiring 236 channels in all, the channels may be in effect made to be acceleration channels one being required for each acceleration gate. In keeping with the foregoing discussion, 360 such channels would be required. The change of the analysis channels from range rate gates to acceleration gates is accomplished by replacing the fixed frequency local oscillator signal that was sequentially modulated with a series of functions corresponding to different accelerations, with a local oscillator signal that sweeps in frequency over a band corresponding to all the range rate gates and which is continuously modulated with a function representing a single acceleration. FIG. 6 shows the arrangement for such a device with the signals being supplied to the analysis channels 35, 36 and 37 of FIG. 3 through the apparatus of FIG. 6, rather than through the components of FIG. 3 identified by the numerals 38 to 54. This apparatus of FIG. 6 has an indicated representative showing of three oscillators 80, 81 and 82, each of which is connected to the corresponding variable reactance device 83, 84 and 85, by means of which the frequency of operation of the oscillators 80, 81 and 82 may be controlled. Typically, the variable reactance devices are reactance tubes, or the like, suitable for rapid variation of the oscillator frequency. Operation of the variable reactance devices 83, 84 and 85 is controlled by sweep signals, a first being obtained from the sweep generator 86 which is of such nature as to provide the previously indicated sweep in frequency of the apparatus over a band corresponding to all of the range rate gates. Typically this sweep generator would produce a signal of sawtooth waveform and cause a 3.5 megacycle per second variation in the frequency of the oscillators 80, 81 and 82. Also connected to the variable reactance devices 83, 84 and 85 are modulators 87, 88 and 89 which are driven by the function generators 90, 91 and 92. Each function generator provides its own characteristic function or variation of the oscillator frequency to compensate for missile characteristics. Typically each function generator could be, as before, a potentiometer by means of which a desired proportion of a sawtooth waveform could be selected. In addition it could include various nonlinear devices such as crystals to produce a nonlinear variation of the basic sawtooth function signal. Each of the function generators 90, 91 and 92 is connected to the sawtooth waveform generator 93 which provides the basic sawtooth function previously indicated for the manipulation thereon by the function generators 90, 91 and 92. Sawtooth waveform generator 93 is timed by suitable timing signal obtained by multiplication from 180 cycles per second operative at a frequency of 4,140 cycles per second. In addition the sweep generator 86 is operative at a frequency of 0.5 cycles per second obtained from a division of 180 cycles per second.

Obviously many modifications and variations of the present invention are possible in the light of the above teachings. It is therefore to be understood that within the scope of the appended claims the invention may be practiced otherwise than as specifically described. For example, commutation of mixer 67 of FIG. 4 as well as the unit 73 of FIG. 5 may be desired to further improve signal-to-noise ratio. Additionally the basic display of FIG. 4 can be refined to improve signal to noise ratio by more effective utilization of the capabilities of the display devices.

What is claimed is:

1. In a signal storage and playback object locator system employing narrow bandwidth return signal analysis principles, apparatus for compensating for frequency shift of return signal beyond the analysis bandwidth as a result of relative motion between the system and return signal producing objects comprising, a plurality of analysis channels having narrow bandwidths selectively responsive to different frequencies, and means for varying the playback frequency in a selected pattern corresponding to variations in the rate of said relative motion.

2. In a signal storage and playback object locator system employing narrow bandwidth return signal analysis principles, apparatus for compensating for frequency shift of return signal beyond the analysis bandwidth as a result of relative motion between the system and return signal producing objects comprising, a plurality of analysis channels having narrow bandwidths selectively responsive to different frequencies, means for varying the playback frequency in a selected pattern corresponding to variations in the rate of said relative motion, and means for varying said pattern to obtain compensation for a plurality of different patterns of variations in the rate of said relative motion.

3. An object locator system comprising, means emitting signals, means for receiving signals returned by distant objects, means for storing received signals, a narrow bandwidth analysis channel, means for controlling the playback of stored signals whereby signals stored intermittently for a selected range are played back continuously without substantial intervening time interruptions, and means for varying the frequency of playback signals whereby they are held within the bandwidth of the analysis channel.

4. An object locator system comprising, means emitting signals, means for receiving signals returned by distant objects, means for storing received signals, a plurality of narrow bandwidth analysis channels, each selectively responsive to a different frequency band, means for controlling the playback of stored signals whereby signals stored intermittently for a selected range are played back continuously without substantial intervening time interruptions, and means for varying the frequency of playback signals whereby they are held within the bandwidth of one analysis channel.

5. An object locator system comprising, means emitting signals, means for receiving signals returned by distant objects, means for storing received signals, a plurality of narrow bandwidth analysis channels, each selectively reponsive to a different frequency band, means for controlling the playback of stored signals whereby signals stored intermittently for a selected range are played back continuously without substantial intervening time interruptions, and means for varying the frequency of playback signals in a selected pattern corresponding to variations in the rate of relative motion between the system and a distant signal return object whereby the frequency varied playback signals are held within the bandwidth of one analysis channel.

* * * * *